United States Patent [19]

Huse

[11] 4,050,445
[45] Sept. 27, 1977

[54] SOLAR ENERGY COLLECTION SYSTEM

[75] Inventor: Henry Huse, Darien, Conn.

[73] Assignee: Atlantic Fluidics, Inc., Stamford, Conn.

[21] Appl. No.: 708,205

[22] Filed: July 23, 1976

[51] Int. Cl.² .................................................. F24J 3/02
[52] U.S. Cl. ................................................... 126/271
[58] Field of Search ................ 126/270, 271; 237/1 A

[56] References Cited

U.S. PATENT DOCUMENTS 3,894,528  7/1975  Stubblefield ...................... 126/271
4,011,731  3/1977  Meckler .............................. 126/271

*Primary Examiner*—Carroll B. Dority, Jr.
*Attorney, Agent, or Firm*—Kane, Dalsimer, Kane, Sullivan & Kurucz

[57] ABSTRACT

A system for collecting solar energy in the form of heat in liquid at low temperature, raising the temperature by vapor compressor means and by heat transfer means storing the heat energy at a temperature which is higher than the temperature originally obtained from the solar heat collector.

13 Claims, 5 Drawing Figures

SOLAR ENERGY COLLECTION SYSTEM

BACKGROUND OF THE INVENTION

Solar heat collectors typically consist of a surface to absorb heat energy from the sun and a heat exchanger means whereby a liquid, usually water receives the heat. The liquid is then pumped to a heating system, process, or storage, and then recirculated. The amount of heat that can be collected by this means is a function of solar intensity, collector efficiency, and transmission losses.

Since solar heat can be collected only during daylight it is common practice to provide a reservoir or storage tank where the heat can be stored and used during times when no energy is being received from the sun, such as at night and on cloudy days. On bright sunny days an efficient solar collector can heat water to temperature as high as 18020 F with ambient temperature near freezing.

Mounting and location of the heat collecting means is of great importance in solar energy collecting systems. One of the disadvantages of flat roof mounted solar heat collectors is that during much of the time the intensity of available solar energy is low, and when ambient temperature is correspondingly low it is not possible to raise the water temperature to a temperature high enough for direct use or storage. For example, on a cloudy day with 45° F ambient it may not be possible to raise water temperature to more than 100° F, and at that low temperature auxilliary energy would be required to raise the temperature to a practical level for use. Solar energy has not been used extensively in areas subject to extremely low temperature and persistant cloud cover, such as the high latitudes where days are short, temperatures are cold, and there is little sunshine.

Solar heat collectors of the flat plate type commonly used operate at an efficiency of 30 to 60 percent with collection efficiencies ranging from 40–60 percent for 30° F temperature rise and 30 percent or less for a 100° F temperature rise. Conduction losses, radiation losses and convection losses all increase directly with an increase in temperature differential.

Solar energy in the form of sunlight has a maximum average intensity of 429 BTU/hr/sq. ft. multiplied by the cosine of the latitude angle. Thus, the intensity level is approximately 422 BTU/hr/sq. ft. at 10° latitude but only 328 BTU/hr/sq. ft. at 40° latitude. Furthermore, the incidence of cloud cover further diminishes the amount of collectable solar energy. Therefore, in the upper latitudes, where heat energy is most needed, the economical utilization of solar energy is restricted by (a) lower direct solar energy level, (b) greater cloud cover, (c) shorter daylight hours in winter, and (d) lower ambient temperature and consequent greater thermal losses due to conduction, convection, and radiation.

Currently solar energy is used primarily for heating houses and buildings. A typical system consists of a solar heat collector of the flat plate type through which water is circulated by a pump. The heated water coming from the collector is piped to a heat reservoir which is used to store heat extracted by the collector. The reservoir may be a large volume of water, rocks, or phase change material such as Glauber's salt. Secondary fluids are piped through the reservoir and by heat exchanger means heat is extracted from the reservoir. Heat obtained by this method is used for heating water and space heating by means of fan coil units, baseboard hot water heaters, radiant heating, etc. In a system of this type the reservoir temperature cannot be raised above the temperature of the water or liquid coming from the heat collector. Thus, effective heat input can be obtained only during those periods of time when solar energy intensity is high. When the solar heat collector temperature is low the circulating pump must be shut off; otherwise heat would be pumped from the reservoir back out to the collector. Because of this restricted utilization of the heat collector the storage volume must be very large so that enough heat energy can be stored during peak solar energy intensity to provide heat for several days during which little if any heat energy can be extracted by the heat collector. The problem is further compounded by temperature losses due to the temperature differential required by the heat exchangers.

To overcome these problems solar concentrators can be used to raise the temperature of the fluid. These concentrators make use of magnifying glasses or parabolic reflectors. They are extremely costly, and require positioning to track the path of sunlight as the sun's position shifts. For this reason solar concentrators are seldom used.

Because of the shortcomings of conventional solar heating systems auxilliary heating means such as oil, gas or electric energy is invariably required.

SUMMARY OF THE INVENTION

The solar energy system described herein makes possible the efficient collection, use, and storage of solar heat during times when solar energy intensity is low, thus extending the practical use to areas where sunshine is not plentiful. The system provides a means whereby the efficiency of the solar energy collector is improved by operating with lower temperature rise. The low temperature energy in the primary fluid from the collector is transmitted by vapor compression means to a secondary fluid at higher temperature for process use or storage. Use is made of a collector to to absorb solar energy with a pump to circulate water, or other fluid, to the collector. A flash chamber is used in which heated water from the collector is sprayed and partially flashed to vapor. Further components include a compressor to extract vapor from the flash chamber, and a condenser or heat exchanger means which serves to transmit heat of condensation to a secondary liquid medium for process use or storage. A vacuum pump may be employed to remove non-condensable gases from the system and permit operation at subatmospheric pressure.

The process utilizes a method of heat transfer whereby the heated water or fluid is pumped to a vacuum, or flash, chamber which is at a pressure corresponding to the vapor pressure at the temperature of the incoming water. As the water enters the chamber part of it flashes into vapor. As it does so it removes approximately 1000 BTU per pound of vapor extracted, thus cooling the water which is then collected and pumped back to the solar heat collector. The vapor from the flash chamber is compressed and delivered at higher temperature and pressure to a heat exchanger means where the vapor condenses giving up heat to a secondary fluid.

The compressor thus provides a means of amplifying low temperature energy to high temperature energy usable for process work or storage.

In this system the condensed vapor is collected and recycled back to the primary heat collector system so that no loss of liquid is incurred. While water is the most commonly available fluid for use in the solar heat collector other fluids having higher or lower vapor pressure may be used also. Anti-freeze solutions such as glycols or salts can be added to a water system to prevent freezing during inoperative periods. Such additives, while increasing the vapor pressure and raising the flash temperature of the fluid, would not interfere with the operation of the system.

The invention therefor makes use of a primary fluid to extract solar heat from the collector and a secondary fluid for transmitting the heat at higher temperature to the process. The exchange of heat takes place by the flashing of vapor from the primary fluid and condensing the vapor directly or through heat exchanger means in the secondary fluid. By this method each pound of water flashed from the primary fluid removes approximately 1000 BTU from the fluid circulating through the solar heat collector. Each pound of vapor condensed into the secondary fluid gives up approximately 1000 BTU to the secondary fluid.

Heat transfer can be effected through shell and tube heat exchanger or by direct contact with the secondary fluid. The shell and tube heat exchanger provides a means whereby the primary and secondary fluids can be dissimilar. In the preferred embodiment the system makes use of a unique and highly efficient two stage compressor. The compressor utilizes a rotary positive displacement first stage backed by a rotary liquid ring second stage compressor, the combination of which provides a means of compressing vapor from subatmospheric pressure to atmospheric or higher pressure. Such system obviates the need for a supplementary vacuum pump.

In combination the two compressors operate in complimentary fashion. The first stage positive displacement compressor extracts a large volume of vapor from the evaporator and compresses it adiabatically to a pressure a few pounds higher than inlet conditions. The heat of compression elevates the temperature and it is discharged superheated at higher pressure and temperature. In common with the liquid ring second stage compressor water is injected into the interstage between the two compressors, desuperheating the vapor and reducing its volume accordingly. The vapors are then pumped by the second stage liquid ring compressor to the final discharge pressure (normally atmospheric) where seal water and vapor are discharged into the heat exchanger or direct contact storage tank. Some of the vapor condenses during compression in the second stage liquid ring compressor and the balance is condensed in the heat exchanger or tank.

Another feature of the invention is a by-pass conduit from the solar heat collector to the secondary fluid heat exchanger. The purpose of this conduit is to by-pass the vapor compression system during times when intense solar energy is sufficient to raise water temperature to a usable level without need of temperature amplification. Ideally, the by-pass is provided with three way solenoid valve actuated by a temperature sensing element and switch in the discharge from the solar heat collector. It can be set for any desired temperature. Assuming a temperature setting of 160° F, the valve would open to by-pass when the temperature from the solar collector is 160° F or over. During periods of low solar energy intensity when 160° F cannot be reached in the collector the temperature sensing switch would energize the vapor compression system and close off flow through the by-pass conduit. This control system would conserve electrical energy by shutting down the vapor compressor when its use is not required.

A low temperature sensing switch can be employed normally to shut off the solar energy system entirely when insufficient heat energy can be collected to warrant operation of the system, such as at night or during times when solar intensity is extremely low. While electrical energy is required to provide vapor compression and heat transfer the energy required is more than compensated for by the increase of heat absorbed by the solar collector and the extension of time during which solar energy can be absorbed. An energy balance can be described by the following illustrations: Assume a 1000 sq. ft. flat plate roof mounted collector is absorbing low intensity solar heat at a rate of 100 BTU/sq. ft./hr. and the ambient temperature is 40° F. Water circulation rate is 10 GPM and water is extracted from the collector at 130° F. The solar heat input is 1000,000 BTU/hr. To extract this energy the flash chamber is at 1.27 psia pressure and 1.5 lbs/min. of vapor representing 400 CFM are compressed to 155F and 14.7 psia. The energy transferred is 1667 BTU/min. Energy required by the 3HP compressor motor and circulating pump is 140 BTU/min. and latent heat of condensate returned to the primary fluid is 160 BTU/min. The net energy gain is 1667 − 140 − 160, or 1367 BTU/min. (82,020 BTU/hr.). Thus, it can be seen that under conditions of low intensity solar energy input the system described in the invention makes possible an economical net energy gain of nearly 10 times energy output.

The invention described herein provides a means of collecting heat with lower temperature differential across the collector thereby improving collector efficiency. The invention provides higher heat storage temperature, smaller heat reservoir volume, and elimination of the requirement for auxilliary direct heating means.

DESCRIPTION OF THE INVENTION

Figure 1:
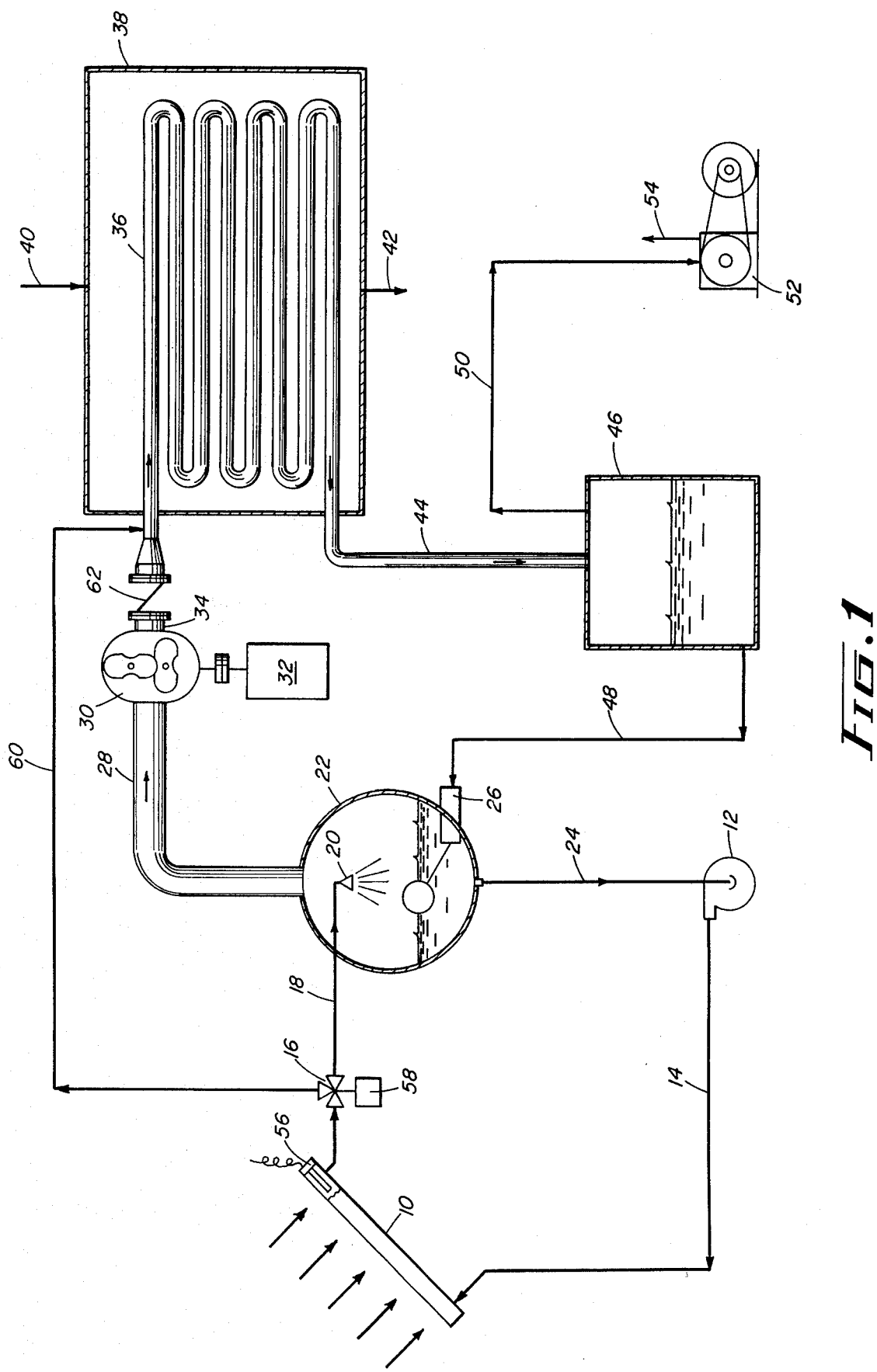
FIG. 1 is a diagrammatic showing of a solar energy collection system in accordance with the invention including vapor compressor and auxillary vacuum pump.

FIG. 1 illustrates a solar energy collection system in accordance with the invention. A plate solar collector 10 is employed to utilize solar energy to heat water or fluid contained therein. The fluid can be pumped by means of pump 12 via conduit 14 through the collector 10 via three-way valve 16 and conduit 18 to nozzle 20 located within vacuum chamber 22. As the warmed water is sprayed through nozzle 20 a portion of it flashes to vapor and as it does so the heat of vaporization (approximately 1000 BTU per pound) is removed. The cooled water collects in chamber 22 and is recirculated via conduit 24 to pump 12. A constant level of water can be maintained in chamber 22 by means of water level control valve 26.

Vapor is removed from chamber 22 via conduit 28 by vapor compressor 30 driven by motor 32 and delivered through conduit 34 to tubes 36 immersed in fluid contained within vessel 38. Vapor condensing within tubes 36 gives up heat of condensation (approximately 1000 BTU per pound) to the liquid contained in vessel 38.

Conduit means 40-42 is provided to convey the heated liquid in vessel 38 to process use or storage. Condensed vapor within tubes 36 is piped via conduit 44 to collection chamber 46 from which it is returned via conduit 48 to the vacuum chamber through liquid control valve 26. Noncondensable gases are removed from the system via conduit 50 to vacuum pump 52 and discharged to atmosphere via vent 54.

As a control means a temperature sensing switch 56 can be located at the discharge from collector 10. When sensing switch 56 senses temperature above a predetermined set level solenoid 58 is arranged to be energized which opens three way valve 16 to permit liquid from the collector 10 to by-pass compressor 30 via conduit 60. A check valve 62 can be provided in conduit 34 to prevent backflow of liquid into compressor 30.

Action of temperature switch 56 also shuts off compressor 30 and vacuum pump 52 so that electrical energy is conserved.

Figure 2:
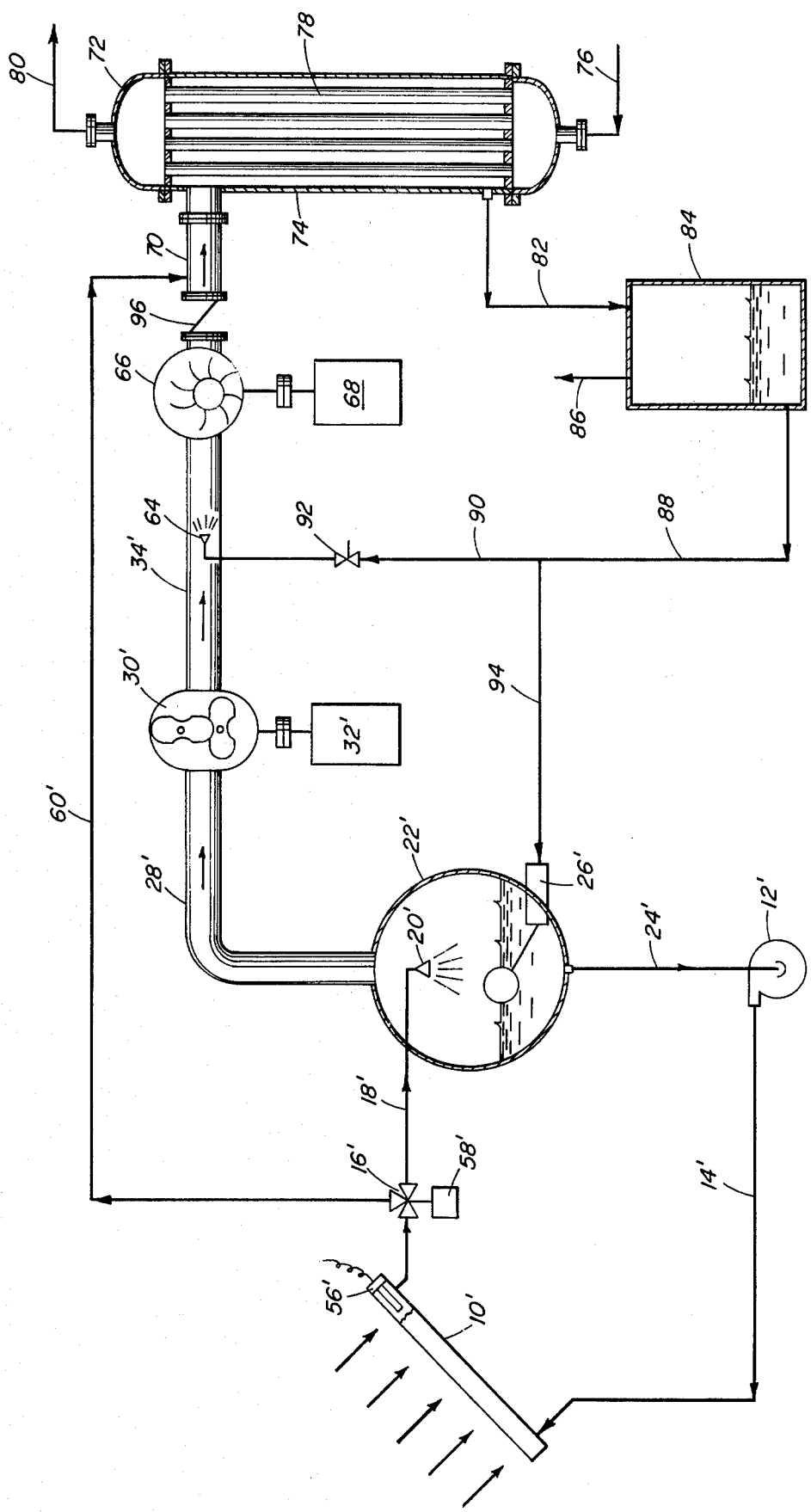
FIG. 2 is a diagrammatic showing a solar energy collection system similar to that shown in FIG. 1, but including a two-stage vapor compression system and shell and tube type heat exchanger.

FIG. 2 shows a solar energy collection system according to the invention which is similar to that shown in FIG. 1 but utilizing a unique two stage vapor compression system to effect heat transfer from the solar collector to process or storage. Parts in FIG. 2 which are similar to parts in FIG. 1 have been given a like number with a prime.

Water or other fluid is pumped through solar heat collector 10' by pump 12' via conduit 14' through three way valve 16' and conduit 18' and sprayed through nozzle 20' into vacuum chamber 22'. A portion of the water flashes to vapor removing heat of vaporization from the water which collects in the chamber 22' and recirculated via conduit 24' to pump 12'. Water level is maintained in chamber 22' by float control valve 26'.

Vapor is removed via conduit 28' to first stage rotary positive displacement compressor 30' driven by motor 32'. The compressor 30' can be of the Roots type as shown, spiraxial screw type, or other. The vapor is compressed adiabatically by compressor 30' and enters conduit 34' as superheated vapor. There it is contacted by water sprayed from nozzle 64 and desuperheated. Water and saturated vapor then enter second stage liquid ring compressor 66 driven by motor 68. It is compressed to atmospheric pressure, or greater, and discharged via conduit 70 to heat exchanger 72. In this embodiment the discharged water and vapor are shown entering the shell 74 side of a typical shell and tube heat exchanger. Water or other secondary fluid entering through conduit 76 passes through tubes 78 where it picks up latent heat and heat of condensation from the water vapor mixture discharged from compressor 66. Heated water or fluid exists via conduit 80 and is pumped to process or storage.

Water and condensate flow by gravity via conduit 82 into chamber 84 where water is collected and non-condensable gases and air are vented via vent conduit 86. Water is recirculated via conduits 88 and 90 through flow control valve 92 to spray nozzle 64. This water acts as a desuperheater and also provides sealing water for the liquid ring compressor 66.

Water is transmitted via conduit 94 and liquid level control valve 26' into chamber 22' and is then recirculated via conduit 24' and pump 12'. The amount of water entering the chamber via conduit 94 and valve 26' is equal to the amount of vapor removed via conduit 28' so a constant volume of water is contained in the primary water supply which transmits heat from collector 10.

In the embodiment of FIG. 2; as is also true of the embodiment of FIG. 1, when solar energy intensity is high and temperature water is generated in collector 10, temperature sensing switch 56' can energize an electrical control circuit (not shown) which shuts off compressors 30' and 66 (in the embodiment of FIG. 2 and compressor 30 in the embodiment of FIG. 1) and causes solenoid 58' to operate three way by-pass valve 16' so that water is bypassed via conduit 60' to heat exchanger 72. A check valve 96 prevents backflow of water into compressor 66.

In describing the function of bypassing the vapor compression system of FIGS. 1 and 2 it is implicit, though not shown, that the heat exchanger means, tanks, etc. will be so arranged to permit gravity flow of the liquid to circulating pump 12 and 12'.

Figure 3:
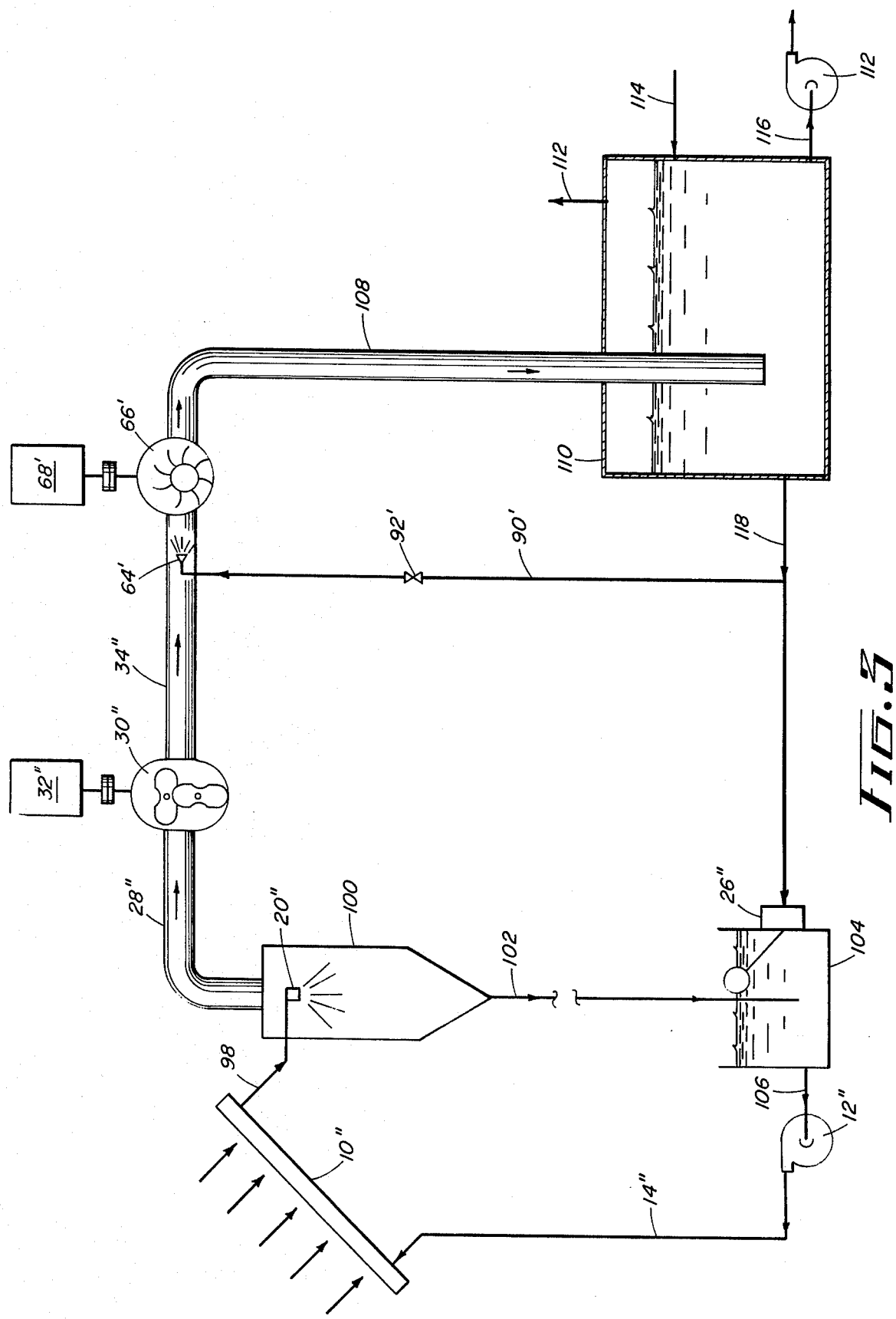
FIG. 3 is a diagrammatic showing a solar energy collection system including a two-stage vapor compression system, flash chamber with barometric leg., and direct contact heat transfer means, which is a variation of that shown in FIG. 2.

FIG. 3 illustrates a variation of the unique two-stage vapor compressor described in FIG. 2. Parts similar to parts shown in FIGS. 1 and 2 are given the same number followed by double prime, while parts similar to parts shown only in FIG. 2 are given the same number as FIG. 2 but with a single prime.

In the system of FIG. 3 water heated in solar collector 10" flows through conduit 98 into flash chamber 100 which is provided with barometric leg 102. Water sprayed through nozzle 20" flows by gravity through barometric leg 102 into reservoir sump 104 provided with liquid level control valve 26" which maintains a constant level in the reservoir 104. Water is recirculated to the collector 10" by pump 12" via conduits 106 and 14".

Vapor flashed from water spray in chamber 100 is transported through conduit 28" to first stage compressor 30" driven by motor 32". Vapor is compressed adiabatically by compressor 30" and discharged into interstate conduit 34" at higher temperature and pressure. Water sprayed through nozzle 64' located in conduit 34" acts as a desuperheater and provides liquid sealing fluid for second stage liquid ring compressor 66' driven by motor 68'. During compression in the liquid ring compressor 66' the vapor is in intimate contact with sealing water, or liquid, and some condensation occurs. The non-condensed vapor and seal water are discharged through conduit 108 into reservoir tank 110 where residual vapor is condensed and heat is added to water or liquid in the reservoir tank 110. A vent 112 is provided for venting non-condensable gases and circulation of water to and from the tank 110 by means of pump 112 and conduits 114 and 116. Water from tank 110 is recirculated via conduits 118 and 90' through flow control valve 92' to nozzle 64'. Makeup water equal to the amount of vapor extracted from chamber 100 flows by gravity to reservoir sump 104. This system is simple and inexpensive since no shell and tube condensers or other heat exchanger means are required for transfer of heat from solar collector 10" and heat storage tank 110. In this arrangement condensation occurs during compression in the second stage liquid ring compressor 66' as well as direct contact with water in tank 110. The liquid in the tank 110 receives the heat of condensation directly in this embodiment whereas in the embodiments shown in FIGS. 1 and 2 the means for transferring heat to the fluid in the respective tanks was the wall of the tube within the tank.

Figure 4:
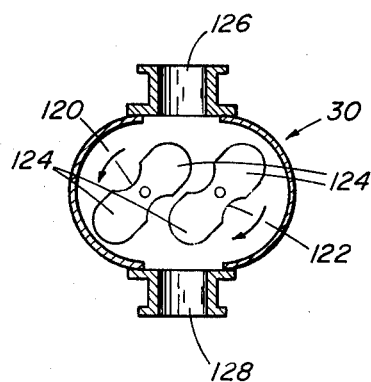
FIG. 4 is a side sectional view of the first stage rotary positive displacement compressor utilized in the systems shown in FIGS. 2 and 3.
Figure 5:
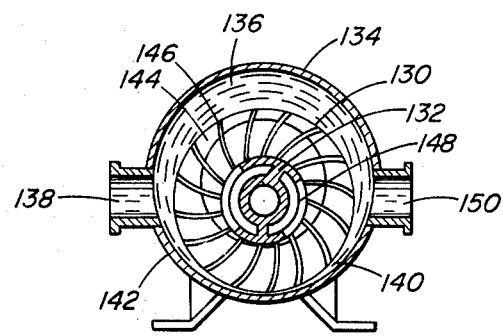
FIG. 5 is a side sectional view of the second stage liquid ring compressor utilized in the systems shown in FIGS. 2 and 3.

The compressors identified in FIGS. 1, and 2 and 3 by the numerals 30, 30' and 30" respectively are identical and shown in FIG. 4 as a rotary positive displacement compressor of the Roots type. It consists of two counterrotating rotors 120 and 122 matched to rotate together in counter rotation without metal-to-metal contact. The vapor is trapped by intermeshing lobes 124 of the rotors and displaced from the low pressure zone at inlet 126 to the high pressure zone at outlet 128. The second stage liquid ring compressors 66 and 66' respectively of the systems shown in FIGS. 2 and 3 are also identical and shown in FIG. 5 having one rotating part, a bladed rotor 130 which rotates freely and without metal-to-metal contact around a stationary port cylinder 132. The rotor 130 and port cylinder 132 are concentric but the casing 134 has an eccentric lobe 135 formed therein. Sufficient sealing water is supplied through inlet 138 to form liquid ring 140 inside the casing 134 conforming to the eccentric contour of the casing. The port cylinder 132 is provided with inlet port 142 located such that it corresponds to the position at which liquid ring 140 is receded away from port cylinder 132 thereby defining chamber 144 between rotor vanes or blades 146 in which vapor entering inlet 138 is trapped.

As rotation continues the chamber volume is reduced by compression caused by the liquid ring 140 as it is being forced by casing 134 contour radially inward toward the port cylinder 132. At the end of the compression stroke the vapor is compressed by liquid ring 140 and forced into the discharge port 148 of the port cylinder 132.

The vapor and a portion of the sealing water is then discharged from pump outlet 150 to the heat exchanger or reservoir tank of the system.

I claim:

1. A solar energy collection system including in combination a liquid containing solar heat collector, a vacuum chamber, a nozzle within said vacuum chamber receiving warmed liquid from said solar heat collector and spraying it into said vacuum chamber, a fluid containing vessel, passage-conduit means within said fluid containing vessel, means for transferring heat from said passage-conduit means to the fluid in said fluid containing vessel, vapor compression means receiving vapor from said vacuum chamber and delivering it to said passage-conduit means and means for delivering fluid from said vessel to use.

2. A solar energy collection system in accordance with claim 1 in which pump and first conduit means are provided for recirculating cooled liquid from said vacuum chamber to said solar heat collector.

3. A solar energy collection system in accordance with claim 2 in which there is provided, a collection chamber to receive condensed vapor from said passage-conduit means, a liquid level control valve associated with said vacuum chamber and second conduit means to supply condensed vapor to said vacuum chamber under the control of said liquid level control valve to maintain a constant level of liquid in said vacuum chamber.

4. A solar energy collection system in accordance with claim 1 in which there is provided, a temperature sensing switch at the discharge of said solar heat collector and by-pass valve means whereby when said sensing switch senses a temperature above a predetermined set level, liquid from said heat collector is by-passed said vacuum chamber and introduced directly into said passage-conduit means.

5. A solar energy collection system in accordance with claim 1, in which said vapor compression means includes a first stage rotary positive displacement compressor and a second stage liquid ring compressor.

6. A solar energy collection system in accordance with claim 5 in which there is provided a collection chamber for receiving condensed vapor from said passage-conduit means, an interstage conduit between said first and second stage, spray means within said interstage conduit and means to supply liquid from said collection chamber to said spray means for desuperheating vapors discharged from said first stage and to provide sealing liquid for said second stage.

7. A solar collection system in accordance with claim 5 in which pump and first conduit means are provided for recirculating cooled liquid from said vacuum chamber to said solar heat collector.

8. A solar collection system in accordance with claim 6 in which there is provided a liquid level control valve associated with said vacuum chamber and second conduit means to supply condensed vapor to said vacuum chamber under the control of said liquid level control valve to maintain a constant level of liquid in said vacuum chamber.

9. A solar collection system in accordance with claim 5 in which there is provided, a temperature sensing switch at the discharge of said solar heat collector and by-pass valve means whereby when said sensing switch senses a temperature above a predetermined set level, liquid from said heat collector is by-passed said vacuum chamber and introduced directly into said passage-conduit means.

10. A solar collection system in accordance with claim 1 in which said vacuum chamber is elevated above a liquid reservoir sump and connected thereto by a barometric leg whereby liquid in said vacuum chamber can flow by gravity through said barometric leg into said sump and a liquid level control valve for maintaining a constant predetermined liquid level in said sump.

11. A solar collection system in accordance with claim 5 in which said vacuum chamber is elevated above a liquid reservoir sump and connected thereto by a barometric leg whereby liquid in said vacuum chamber can flow by gravity through said barometric leg into said sump and a liquid level control valve for maintaining a constant predetermined liquid level in said sump.

12. A solar collection system in accordance with claim 1 in which the means for transferring heat from said passage-conduit means to the liquid in the fluid containing vessel consists of vapors from said passage-conduit being intimately contacted with fluid in said fluid containing vessel so that the heat of condensation of vapor is given up directly to fluid contained in said vessel.

13. A solar collection system in accordance with claim 5 in which the means for transferring heat from said passage-conduit means to the liquid in the fluid containing vessel consists of vapors from said passage-conduit being intimately contacted with fluid in said fluid containing vessel so that the heat of condensation of vapor is given up directly to fluid contained in said vessel.

* * * * *